Dec. 5, 1950        T. H. PAYNE        2,532,639
FOOD COOKER
Filed Nov. 18, 1946
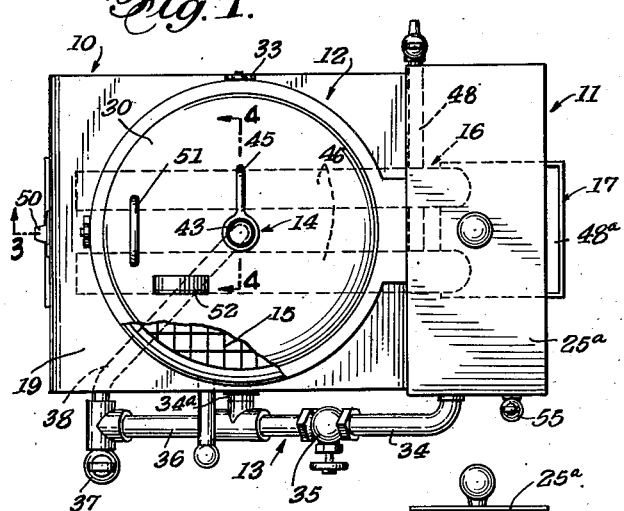
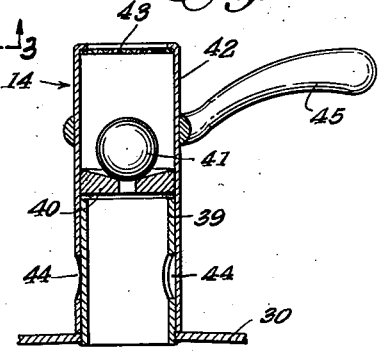
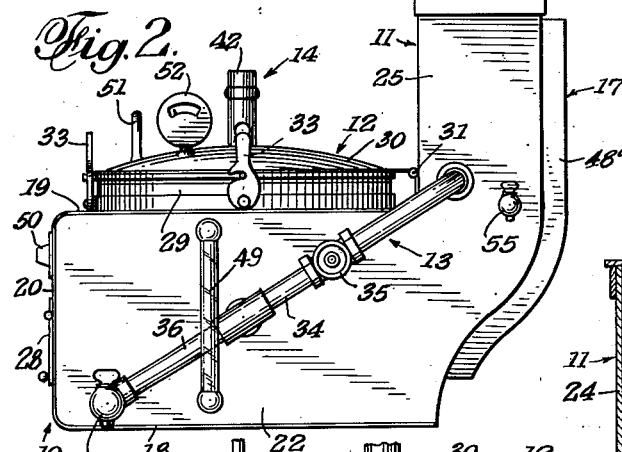
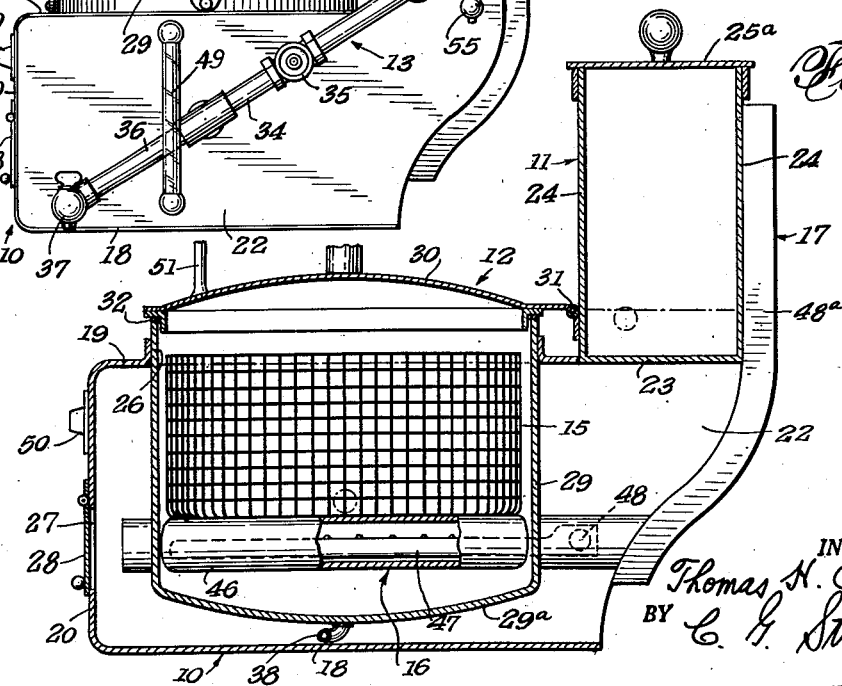
INVENTOR.
Thomas H. Payne
BY C. G. Stratton
ATTORNEY Patented Dec. 5, 1950

2,532,639

UNITED STATES PATENT OFFICE 2,532,639

FOOD COOKER

Thomas H. Payne, Los Angeles, Calif.

Application November 18, 1946, Serial No. 710,704

7 Claims. (Cl. 126—380)

This invention relates to food cookers and more particularly to pressure cookers for rapid and efficient cooking of various items of food requiring browning.

The primary object of the present invention is to provide a cooker in which food is cooked by both steam and cooking oil and wherein the sequence of the cooking steps can be optionally performed to cook first with either the steam or the oil and then with the other medium.

Another object of the invention is to provide a cooker of the character indicated embodying a means effective to conduct cooking oil to food being cooked, to build up steam pressure about the food, to drive said oil to a storage reservoir under pressure of the steam, and to retain the oil in said reservoir until again needed whereby rapid and efficient cooking is accomplished.

Another object of the invention is to provide a cooker in which, optionally, food can be first browned and then pressure cooked or first pressure cooked and then browned. Chicken and other fowl are examples of food cooked by the first mentioned method. French fried potatoes is an example of food cooked by the other method.

A further object of the invention is to provide a novel and improved deep fat frying cooker of the type indicated which embodies novel pressure relieving means of simple and improved form.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a top plan view, partly broken, of a food cooker embodying the present invention.

Fig. 2 is a side view thereof.

Fig. 3 is an enlarged cross-sectional view as taken on the line 3—3 of Fig. 1.

Fig. 4 is a further enlarged vertical sectional view on the line 4—4 of Fig. 1.

The food cooker which is illustrated comprises, generally, a housing 10 which embodies a cooking oil reservoir 11, a pressure cooking pot 12 mounted in the body, connection means 13 between the reservoir 11 and the pot 12, pressure relief means 14 for the pot, a food container 15 removably mounted in the pot, means 16 for heating the pot, and a vent 17 for the heating means.

The housing 10 comprises a generally rectangular enclosed frame having a bottom wall 18, a substantially parallel top wall 19, a front end wall 20, and side walls 22. The rear of the housing is formed with an upper extension which comprises the reservoir 11. The latter has a bottom wall 23, front and rear walls 24, and side walls 25 which are extensions of the walls 22. A suitable loose-fitting removable cover 25a is provided for the open top of the reservoir 11.

The top wall 19 is formed with a flanged opening 26 for the pressure cooking pot 12 and the front end wall 20 has an opening 27 closed by a door 28 to give access to the heating means 16.

The pressure cooking pot 12 comprises a generally cylindrical vessel 29 having a domed bottom wall 29a residing mainly within the housing 10 and having an upper open extension above the top wall 19 of said housing. A cover 30 is provided for the vessel 29 and is hinged at 31 to a wall of the reservoir 11 to be swingable to and from a closed position over the vessel 29. Suitable gasket means 32 is provided to effect sealing of the interior of the pot and releasable locking means such as the lock dogs 33 are provided to hold the cover 30 in closed position over the vessel against the force of internal pressure in the latter.

The connection 13 comprises suitable piping 34 extending from one wall 25 somewhat above the reservoir bottom 23 angularly downward through the related housing wall 22 and into the vessel 29 at 34a. A valve 35 in the piping controls flow therethrough. An extension 36 of said piping is connected to a drain cock 37. A drain connection 38 is also provided from the bottom of the vessel 29 to said drain cock.

The pressure relief means 14 is carried by the pot cover 30 and consists of a tubular extension 39, an orifice plate 40, a ball 41 gravitationally closing the orifice in plate 40, a rotatable sleeve 42 telescopically engaged over the extension 39 and having a perforated upper end 43, registerable openings 44 in the tubular extension and sleeve, and a handle 45 for rotating the sleeve with respect to the extension for obtaining the degree of registration desired of the openings 44. The orifice plate 40 is secured to the sleeve 42. The weight of the ball 41 may be varied to control the blow-off pressure of the relief means. With the openings 44 out of register, it is obvious that pressure is retained in the pot 12 until the same builds up to a degree sufficiently great to unseat the ball 41 whereupon said pressure is relieved through the perforated end 43. By varying the alignment between openings 44, the pressure in the pot 12 can be controlled. Should the orifice in plate 40 become clogged, the pressure will lift the sleeve 42 and vent through the openings 44.

The food container 15 simply consists of a generally cylindrical basket suitably supported within the vessel 29 and affords simple and convenient means for placing items of food into the said vessel and for conveniently removing the same.

The heating means 16 may be either electrical or gas. The latter is shown in the drawing and comprises a pair of tubes 46 placed side by side below the connection 34a and extending horizontally through the vessel 29 above the bottom thereof. Within each tube there is placed a burner 47, the burners being commonly connected to a gas line 48 extending laterally through the housing 10 along the rear portion thereof. The ends of the tubes 46 terminate adjacent the opening 27 in the housing wall 20 so that they may be ignited. In a conventional manner, a pilot light or other ignition means may be provided.

The vent 17 is shown as a flattened conduit 48a connected to the rear ends of the tubes 46 and extending upwardly along the rear wall 24 to terminate near the top of the cooker. The heated gasses passing through the vent serve to warm the oil in the reservoir 11.

The cooker is also provided with a sight gauge 49 for indicating the level of oil in the vessel 29; with a thermostat 50 for controlling the temperature of the oil in said vessel; with a handle 51 whereby the cover 30 is lifted; and with a pressure gauge 52 for indicating the pressure in the pot 12.

As hereinbefore indicated, two cooking methods may be accomplished by the instant cooker. For cooking chickens, the basket 15 is suitably loaded with the fowls and placed in the vessel 29. The cover 30 is held open, the valve 35 opened to drain the cooking oil from the reservoir 11 into the cooking pot 12, and the burners ignited. When the contents of the basket have been suitably browned, the cover is closed. The cooking proceeds and steam pressure builds up in the pot 12 above the level of the oil therein until said pressure becomes effective to drive the oil from the pot through the connection means 13 into the reservoir 11. This steam pressure will empty the vessel 29 of oil only to the point of the connection 34a and oil will remain in the bottom of the pot to cover the heating means 16 at all times. The valve 35 is then closed and the cooking continues until the contents of the basket 15 are cooked. Thus, the oil first browns the chickens or other food items in the pot and steam resulting from the moisture released by said items completes the cooking operation. The pressure is relieved in the pot 12 by turning the handle 45 to register the openings 44, the cover 30 is released and lifted and the basket of cooked food removed. The cooking operation is quite rapid, approximating five minutes, and can be done by restaurateurs to order and quickly. Another basket of food is then placed in the cooker and the operation repeated.

For other foods such as French fried potatoes, the oil is held in the reservoir until the food is first steam-pressure cooked. The pressure is then relieved and the oil drained into the vessel 29. The cooking continues until the pressure again builds up to a degree sufficient to drive the oil back into the reservoir. The food will then be nicely browned and thoroughly cooked.

The pot 12 and the reservoir 11 are quickly drained by opening valve 35 and cock 37 and such sludge as remains in the bottom of said reservoir can then be readily removed by first removing the cover 25a. The vessel 29 is also easily cleaned and, if desired, the piping 34 can be flushed out to remove solid matter. A drain cock 55 is provided for removing the accumulation of sludge from the bottom of the reservoir 11 as an aid to cleaning the latter.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A food cooker comprising a pressure sealed cooking pot, an open reservoir for cooking oil mainly above the upper portion of said pot, means for heating the pot to generate steam pressure resulting from the moisture in the food being cooked, a connection from the pot to the reservoir for conducting cooking oil displaced by the pressure in the pot into the reservoir, said connection extending between a point of the pot below the reservoir and the lower portion of the reservoir and a valve in said connection to retain the oil so displaced into the reservoir.

2. In a cooker of the character described, a pressure sealed pot, means for heating said pot extending therethrough, an open cooking oil reservoir located to be mainly above said pot, a flow connection between the pot and the reservoir whereby cooking oil passes from the latter to the former gravitationally and passes from the former to the latter under pressure in the former, said connection extending between a point of the pot below the reservoir and the lower portion of the reservoir and means for controlling said flow connection.

3. In a cooker of the character described, a pressure sealed pot, means for heating said pot extending therethrough, means for venting the heating means, an open cooking oil reservoir located to be mainly above said pot, a flow connection between the pot and the reservoir whereby cooking oil passes from the latter to the former gravitationally and passes from the former to the latter under pressure in the former, said connection extending between a point of the pot below the reservoir and the lower portion of the reservoir and means for controlling said flow connection.

4. In a cooker of the character described, a pressure sealed pot, means for relieving the pressure in the pot both automatically and manually, means for heating said pot extending therethrough, an open cooking oil reservoir located to be mainly above said pot, a flow connection between the pot and the reservoir whereby cooking oil passes from the latter to the former gravitationally and passes from the former to the latter under pressure in the former, said connection extending between a point of the pot below the reservoir and the lower portion of the reservoir and means for controlling said flow connection.

5. In a cooker of the character described, a pressure sealed pot, means for heating said pot extending therethrough, an open cooking oil reservoir located to be mainly above said pot, a flow connection between the pot and the reservoir whereby cooking oil passes from the latter to the former gravitationally and passes from the former to the latter under pressure in the former, means for controlling said flow connection, said connection extending between a point of the pot below the reservoir and the lower portion of the reservoir and means for draining both the reservoir and the pot.

6. In a cooker of the character described, a pressure sealed pot, means for heating said pot extending therethrough, an open cooking oil reservoir located to be mainly above said pot, a flow connection between the pot and the reservoir whereby cooking oil passes from the latter to the former gravitationally and passes from the former to the latter under pressure in the former, said connection extending between a point of the pot below the reservoir and the lower portion of the reservoir, means for controlling said flow connection, and means for draining both the reservoir and the pot, said latter means comprising a drain cock, a connection from the flow connection to said cock, and a connection from the pot to said cock.

7. A food cooker comprising a pressure-sealed cooking pot, means for supporting said pot for the application of heat thereto, an open cooking oil reservoir mainly above the upper portion of the pot, a manually controlled flow connection between the reservoir and the pot, said connection extending between a point of the pot below the reservoir and the lower portion of the reservoir and pressure retaining relief means carried by the pot and operable to control the flow of oil in said flow connection between the reservoir and the pot.

THOMAS H. PAYNE.

REFERENCES CITED

The following references are of record in the file of this patent:

UNITED STATES PATENTS

| Number | Name | Date |
| --- | --- | --- |
| 601,501 | Culver | Mar. 29, 1898 |
| 703,269 | Hutchings | June 24, 1902 |
| 830,106 | Schreidt | Sept. 4, 1906 |
| 1,007,999 | White | Nov. 7, 1911 |
| 1,393,763 | Demuth | Oct. 18, 1921 |
| 2,088,462 | Buffum | July 27, 1937 |
| 2,204,467 | Beatson | June 11, 1940 |
| 2,287,396 | Roth | June 23, 1942 |
| 2,428,483 | Wittenberg | Oct. 7, 1947 |
| 2,431,753 | Holderle et al. | Dec. 2, 1947 |